United States Patent

Moore et al.

(10) Patent No.: US 10,042,825 B2
(45) Date of Patent: *Aug. 7, 2018

(54) DETECTION AND ELIMINATION FOR INAPPLICABLE HYPERLINKS

(71) Applicant: International Business Machines Corporation, Armonk, NY (US)

(72) Inventors: Stephen J. Moore, Austin, TX (US); Vanessa L. Wilburn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/733,048

(22) Filed: Jun. 8, 2015

(65) Prior Publication Data

US 2016/0162452 A1 Jun. 9, 2016

Related U.S. Application Data

(63) Continuation of application No. 14/560,346, filed on Dec. 4, 2014.

(51) Int. Cl.
  *G06F 17/00* (2006.01)
  *G06F 17/22* (2006.01)
  *G06F 17/30* (2006.01)
  *H04L 29/08* (2006.01)

(52) U.S. Cl.
  CPC .... *G06F 17/2235* (2013.01); *G06F 17/30864* (2013.01); *H04L 67/02* (2013.01)

(58) Field of Classification Search
  CPC .............................................. G06F 17/30864
  See application file for complete search history.

(56) References Cited

U.S. PATENT DOCUMENTS

| | | | |
|---|---|---|---|
| 6,256,631 B1 | 7/2001 | Malcolm | |
| 6,665,837 B1 | 12/2003 | Dean et al. | |
| 7,032,124 B2 | 4/2006 | Greenbaum | |
| 7,689,667 B2 | 3/2010 | Lal | |
| 8,140,579 B2 | 3/2012 | Li et al. | |
| 8,326,941 B2 | 12/2012 | Aviles Sanchez et al. | |
| 8,725,719 B2 * | 5/2014 | Kim | G06F 17/30899 707/709 |
| 9,330,191 B2 * | 5/2016 | Teevan | G06F 17/3089 |
| 2011/0087966 A1 | 4/2011 | Leviathan | |
| 2014/0359490 A1 | 12/2014 | Ma | |
| 2015/0358397 A1 | 12/2015 | Wiseman | |

FOREIGN PATENT DOCUMENTS

CN 102236654 A 11/2011

OTHER PUBLICATIONS

U.S. Appl. No. 14/560,346, filed Dec. 4, 2014; Entitled "Detection and Elimination for Inapplicable Hyperlinks".
Appendix P: List of IBM Patents or Patent Applications Treated as Related.

* cited by examiner

*Primary Examiner* — Mohammed-Ibrahim Zuberi
(74) *Attorney, Agent, or Firm* — Stephanie L. Carusillo

(57) ABSTRACT

In an embodiment of an approach for detecting hyperlinks to inapplicable content, a processor identifies a hyperlink in a first page, wherein the hyperlink references a second page. In one embodiment, a processor accesses content of the second page. In one embodiment, a processor determines whether content of the first page matches, within a predefined threshold, the content of the second page.

5 Claims, 4 Drawing Sheets

DETECTION AND ELIMINATION FOR INAPPLICABLE HYPERLINKS

BACKGROUND

The present invention relates generally to the field of webpage maintenance, and more particularly to an approach for automatic detection and adjustment of hyperlinks in a website based on keyword analysis of the source webpage (e.g., the webpage containing the hyperlink) to the webpage (e.g., the webpage in which the hyperlink in the source webpage is linked to).

In computing, a hyperlink is a reference to data that a user can directly access by selecting the hyperlink. A hyperlink may point to a whole webpage or a specific element within a webpage. A hyperlink has an anchor, which is a location within a webpage from which the hyperlink can be followed from a source webpage. The use of hyperlinking in pages has become more popular within webpage design. More and more pages are being hyperlinked together, creating a vast interconnected system of pages or webpages.

SUMMARY

Aspects of an embodiment of the present invention disclose an approach for detecting hyperlinks to inapplicable content. In one embodiment, a processor identifies a hyperlink in a first page, wherein the hyperlink references a second page. In one embodiment, a processor accesses content of the second page. In one embodiment, a processor determines whether content of the first page matches, within a predefined threshold, the content of the second page.

DETAILED DESCRIPTION

Embodiments of the present invention recognize that when a source page has at least one embedded hyperlink, an operator (or other administrative user tasked with maintaining the source page) may need to identify the quality of the hyperlink(s) embedded within the source page and determine whether each hyperlink is active and, if active, whether each hyperlink is relevant to the subjects associated with the source page. Embodiments of the present invention recognize that manually checking each hyperlink, to make sure each hyperlink is both active and relevant to the source page, can be an arduous and time consuming process, especially when the source page contains a large quantity of embedded hyperlinks.

Embodiments of the present invention disclose a method, computer program product, and computer system to identify one or more hyperlinks, and determine if the identified hyperlink(s) are inactive or active. If the identified hyperlink(s) are active, embodiments of the present invention may perform a keyword analysis on the hyperlinked page to determine whether the hyperlinked page is still relevant with regard to source page 112. Upon determining whether the hyperlinked page is still relevant, embodiments of the present invention may remove inactive hyperlinks, and hyperlinks that are determined to not be relevant to the source page. While the present invention, as described herein, refers to pages in reference to webpages, embodiments of the present invention recognize that pages may be, for example but not limited to, Microsoft document (DOC), Portable Document Format (PDF), Open Document Text (ODT), and other word document formats.

The present invention will now be described in detail with reference to the Figures.

Figure 1:
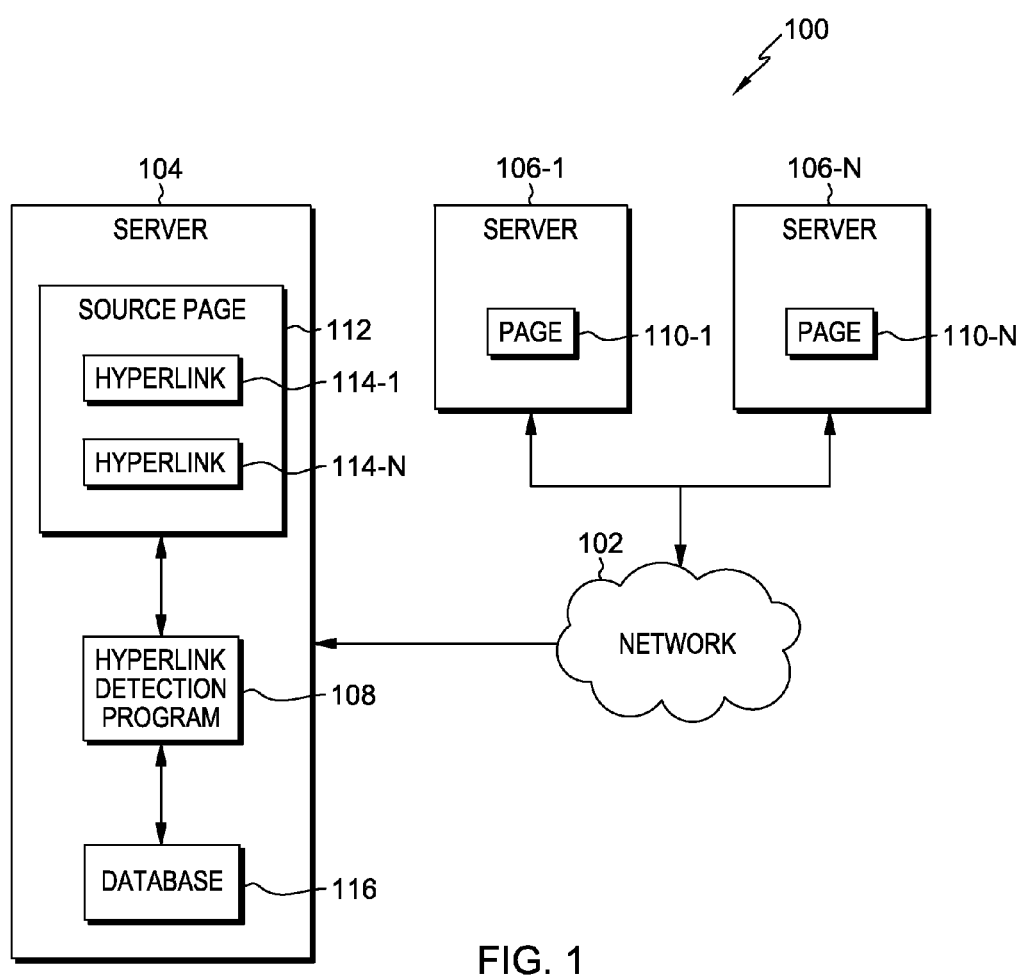
FIG. 1 depicts a block diagram of a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments maybe implemented. In the depicted embodiment, computing environment 100 includes, but is not limited to, a network 102 connecting server 104, server 106-1 through server 106-N. As depicted, computing environment 100 allows hyperlink detection program 108 to locate and analyze hyperlinked page(s), such as pages 110-1 through 110-N, that are linked from within source page 112 via hyperlinks 114-1 through 114-N. Computing environment 100 may include additional computing devices, servers, computers, or other devices not shown.

Network 102 may be a local area network (LAN), a wide area network (WAN) such as the Internet, any combination thereof, or any combination of connections and protocols that will support communications between server 104 and servers 106-1 through 106-N. Network 102 allows communication among source page 112, hyperlink detection program 108, and hyperlinked pages (e.g., page 110-1 through 110-N) to allow hyperlink detection program 108 to perform the necessary analysis.

Server 104 may be a management server, a web server, or any other electronic device or computing system capable of processing program instructions and receiving and sending data. In some embodiments, server 104 may be a laptop computer, tablet computer, netbook computer, personal computer (PC), a desktop computer, or any programmable electronic device capable of communicating with servers 106-1 through 106-N via network 102. In other embodiments, server 104 may represent a server computing system utilizing multiple computers as a server system, such as in a cloud computing environment. In another embodiment, server 104 represents a computing system utilizing clustered computers and components to act as a single pool of seamless resources. Server 104 contains source page 112 with hyperlink 114-1 through hyperlink 114-N, hyperlink detection program 108, and database 116.

Server 106-1 through server 106-N may each be a management server, a web server, or any other electronic device or computing system capable of processing program instructions and receiving and sending data. In some embodiments, server 106-1 through server 106-N may each be a laptop computer, tablet computer, netbook computer, personal computer (PC), a desktop computer, or any programmable electronic device capable of communicating via network 102. In other embodiments, server 106-1 through server 106-N may each represent a server computing system utilizing multiple computers as a server system, such as in a cloud computing environment. In another embodiment, server 106-1 through server 106-N each represent a computing system utilizing clustered computers and components to act as a single pool of seamless resources. Server 106-1 through server 106-N contain page 110-1 through page 110-N, respectively, as depicted in FIG. 1 and described in further detail herein. In one embodiment, page 110-1 through page 110-N are each located on a single server. In another embodiment, page 110-1 through page 110-N are each located on separate servers.

Hyperlink detection program 108 operates to perform an analysis of source page 112. In one embodiment, hyperlink detection program 108 utilizes network 102 to access server 106-1 through server 106-N to gain access to necessary page(s) (e.g., pages 110-1 through pages 110-N) and to perform the analysis on all embedded hyperlinked pages (e.g., pages 110-1 through 110-N). In the depicted embodiment, hyperlink 114-1 links to page 110-1, hyperlink 114-N links to page 110-N, and any additional hyperlinks link to a respective page in a similar manner. In general, hyperlink detection program 108 is able to access the server (e.g., a respective server of servers 106-1 through 106-N) upon which page 110-1 through page 110-N are located on. In another embodiment, server 104 does not need to be connected to network 102 for example, if all the necessary hyperlinked documentation is located solely on server 104 in database 116. Hyperlink detection program 108 is described in further detail with respect to FIG. 2. In some embodiments, hyperlink detection program 108 resides on server 104. In other embodiments, hyperlink detection program 108 may reside on another server or another computing device, provided hyperlink detection program 108 has access to database 116, source page 112, and pages 110-1 through 110-N.

Pages 110-1 through 110-N may each be a word document, a webpage, or other text based document. Pages (e.g., pages 110-1 through 110-N) are linked to source page 112 through hyperlinks (e.g., hyperlinks 114-1 through 114-N). In further embodiments, pages 110-1 through 110-N may each contain images, audio, video, or other non-texted based elements. In one embodiment, one or more pages of page 110-1 through page 110-N may be HTML text documents. In general, each page of page 110-1 through page 110-N is accessible to hyperlink detection program 108 through an embedded hyperlink (e.g., a respective hyperlink of hyperlinks 114-1 through 114-N) in source page 112. In some embodiments, pages 110-1 through 110-N are respectively located on servers 106-1 through 106-N. In other embodiments, one or more pages of pages 110-1 through 110-N may be located on server 104, or another computing device, provided each page of pages 110-1 through 110-N are accessible to hyperlink detection program 108 and source page 112, via respective hyperlinks (e.g., hyperlinks 114-1 through 114-N).

Source page 112 may be any page, such as but not limited to a DOC, PDF, ODT, or hypertext Markup Language (HTML). Source page 112 may include, for example, text pictures, graphs, charts, audio files, video files, or other elements. In general, source page 112 contains at least one hyperlink (e.g., at least one of hyperlinks 114-1 through 114-N) that will relocate the user from the current location in source page 112 to either another location in source page 112, another page located on the same server 104, or another page located on a server 106-1 through server 106-N (e.g., any page of pages 110-1 through 110-N) accessible via network 102. In some embodiments, source page 112 resides on server 104. In other embodiments, source page 112 may reside on another server or another computing device, provided source page 112 is accessible to hyperlink detection program 108, and provided source page 112 has access to pages 110-1 through 110-N.

Hyperlinks 114-1 through 114-N are links to respective pages (e.g., pages 110-1 through 110-N) embedded in source page 112. Hyperlink detection program 108 uses these hyperlinks (e.g., hyperlinks 114-1 through 114-N) to link to respective pages (e.g., pages 110-1 through 110-N) to perform the analysis to determine the relevance of these pages (e.g., pages 110-1 through 110-N) with source page 112. Hyperlinks 114-1 through 114-N can be in the form of but not limited to a textual link, a graphical link, or any other form of hyperlink that can be embedded in a source page 112.

Database 116 may be a repository containing an organized collection of data that may be written to and/or read by hyperlink detection program 108. In one embodiment, database 116 is the storage location for the initial keyword benchmark analysis of source page 112 and hyperlink detection program 108 has performed on source page 112, and any hyperlinked pages (e.g., at least one of pages 110-1 through 110-N). In one embodiment, database 116 is a database management system (DBM) used to allow the definition, creation, querying, update, and administration of a database(s). In other embodiments, database 116 may reside on another server, or another computing device, provided that database 116 is accessible to the hyperlink detection program 108 and source page 112. In some embodiments, database 116 resides on server 104. In other embodiments, database 116 may reside on another server or another computing device, provided that database 116 is accessible to hyperlink detection program 108.

Figure 2:
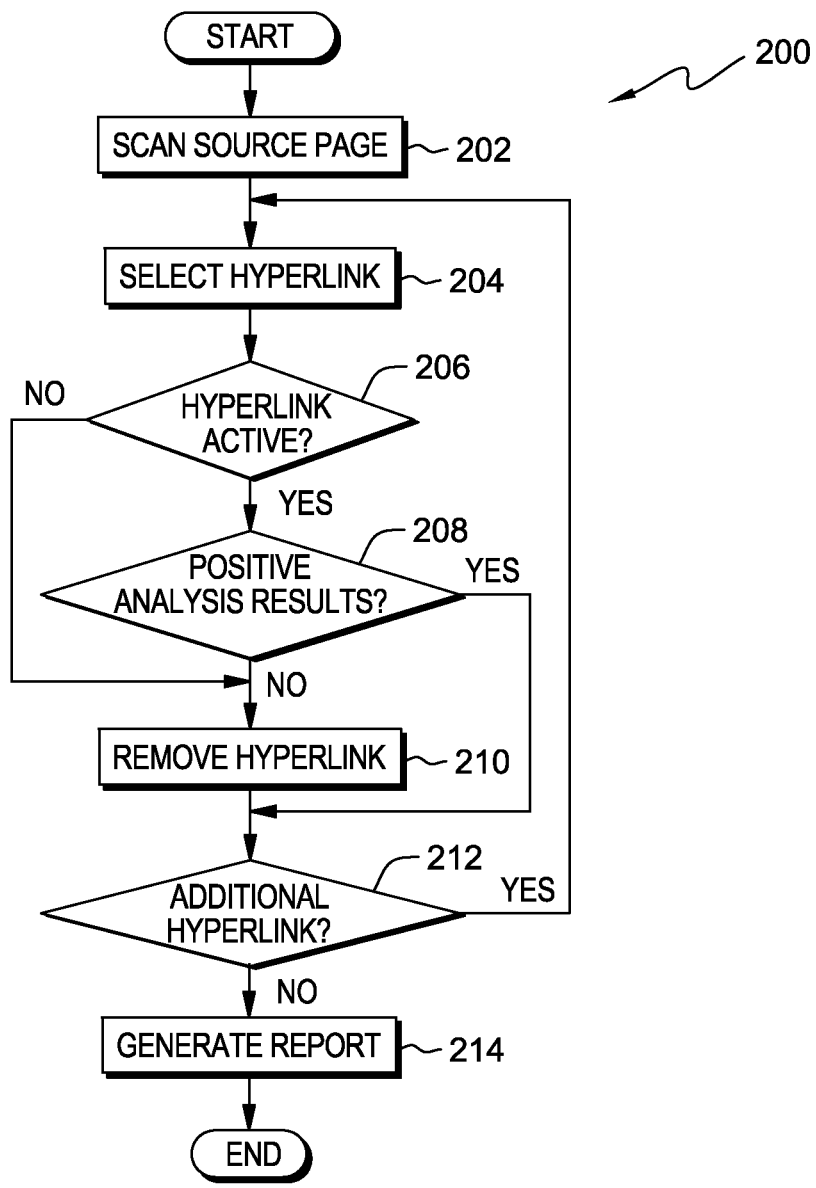
FIG. 2 is a flowchart depicting operational steps of a hyperlink detection program executing within the computing environment of FIG. 1, for detecting, analyzing, and removing a hyperlink, in accordance with one embodiment of the present invention.

FIG. 2 depicts a flowchart of the steps of hyperlink detection program 108 executing within the computing environment 100 of FIG. 1, in accordance with an embodiment of the present invention. Hyperlink detection program 108 searches for hyperlinks (e.g., hyperlinks 114-1 through 114-N) in source page 112 and assess the relevance of the pages associated with each hyperlinked page in the source page (e.g., pages 110-1 through 110-N) based on, for example, a keyword analysis of source page 112 and the respective page (e.g., a page of pages 110-1 through 110-N). As depicted in FIG. 2, flowchart 200 depicts steps performed by hyperlink detection program 108 in performing a search and analysis on pages, such as any one or more pages of pages 110-1 through 110-N, associated with hyperlinks 114-1 through 114-N in source page 112.

In step 202, hyperlink detection program 108 scans source page 112 for embedded hyperlinks (e.g., hyperlinks 114-1 through 114-N). In one embodiment, hyperlink detection program 108 will scan source page 112 until it locates a first embedded hyperlink (e.g., hyperlink 114-1), then proceeds to step 204. In one embodiment, hyperlink detection program 108 scans source page 112 to locate all embedded hyperlinks (e.g., hyperlink 114-1 through 114-N), stores these results in database 116 and proceeds to step 204. In other embodiments, hyperlink detection program 108 scans source page 112 for Hypertext Transfer Protocol (HTTP) hyperlinks in a Hypermedia Reference or Hypertext Reference (HREF), Extensible Markup Language (XML), Standard Generalized Markup Language (SGML), or other scripting languages that create hyperlinks to pages. In further embodiments, hyperlink detection program 108 searches for not only text based pages that are hyperlinked in source page 112, but other hyperlinked data such as image files (e.g., JPEG, Exif, TIFF, RAW, GIF, BMP, PNG), audio files (e.g., MP3, WAV, AU, WMA, DCT, MP4), or video files (e.g., AVI, QuickTime, MPEG, FLV, DAT, WMV) embedded in source page 112.

In step 204, hyperlink detection program 108 selects an embedded hyperlink (e.g., any of hyperlinks 114-1 through 114-N) in source page 112. Hyperlink detection program 108 will select an embedded hyperlink (e.g., hyperlink 114-1 through 114-N) in source page 112 and follow the hyperlink to the corresponding page (e.g., any of pages 110-1 through 110-N).

In decision 206, hyperlink detection program 108 determines if the selected page from the step 204 is active or inactive. In one embodiment, if the selected page returns an Internet Engineering Task Force (IETF) internet standard status code that is, but not limited to, a 3xx Redirection, 4xx Client Error, or a 5xx Server Error, wherein the x's represent numerical values for different internet status codes, then hyperlink detection program 108 may determine that the hyperlink is not active (decision 206, no branch) and hyperlink detection program 108 will cause the selected hyperlink to be removed from source page 112 (see step 210). Examples of status codes that create error messages include, but are not limited to: 301 Moved permanently, 401 Unauthorized, 403 Forbidden, 404 Not Found, or 410 Gone. If the selected hyperlink leads to an active page (e.g., a page of pages 110-1 through 110-N), hyperlink detection program 108 proceeds to decision 208.

In decision 208, hyperlink detection program 108 performs a keyword analysis on a portion of the text in source page 112 and respective page (e.g., a page of pages 110-1 through 110-N). If the page (e.g., a page of pages 110-1 through 110N) does not meet the threshold rating the embedded hyperlink text will be removed from source page 112 (see step 210). The threshold rating are the requirements that are set for hyperlink detection program 108 to determine if a page (e.g., pages 110-1 through 110-N) is relevant to source page 112 or not. In one embodiment, the threshold rating is set by operator preferences. In other embodiments, the threshold rating is set by hyperlink detection program 108, a third party, or additional programs. Hyperlink detection program 108 decision 208 can be in the form of a web crawler, keyword search, meta-tag search, or another process capable of comparing and contrasting text of source page 112 to text of the respective page (e.g., a page of pages 110-1 through 110-N). In one embodiment, hyperlink detection program 108 uses text analytics to parse through all available employment related entry information and create topics based on keywords or common themes within employment related entry descriptions or linked materials. Using natural language processing and at least one set of dictionaries and rules, hyperlink detection program 108 can perform text analytics on source page 112, and page 110-1 through page 110-N. Text analytics can be performed using an Unstructured Information Management Architecture (UIMA) application configured to analyze unstructured information to discover patterns relevant to source page 112 and page 110-1 through page 110-N by processing plain text and identifying relations.

Hyperlink detection program 108 performs a keyword analysis of the hyperlinked text of source page 112 and the entire respective page (e.g., a page of pages 110-1 through 110-N) to analyze if the threshold rating minimum requirement is met. In one embodiment, hyperlink detection program 108 analyzes the sentence the hyperlink is embedded within and hyperlinked page (e.g., page 110-1 through 110-N). For example, when the selected hyperlink text is "click" or "click here," an analysis on the hyperlink text in source page 112 may bring an inaccurate threshold rating causing hyperlink detection program 108 to remove access to a potentially relevant page. In one embodiment, hyperlink detection program 108 will search all neighboring text of hyperlink (e.g., hyperlink 114-1 through 114-N) within source page 112. The neighboring text can be above, below, or next to hyperlink (e.g., hyperlink 114-1 through 114-N). In another embodiment, hyperlink detection program 108 automatically expands the text of source page 112 that is searched, if hyperlink detection program 108 does not determine that the required threshold rating has been exceeded when searching the hyperlinked text or the sentence containing the hyperlinked text and the entire respective page (e.g., a page of pages 110-1 through 110-N).

In some embodiments, hyperlink detection program 108 has a predefined threshold rating that corresponding pages (e.g., pages 110-1 through 110-N) are required to meet in order for hyperlink detection program 108 to determine that the hyperlink should remain as an active hyperlink embedded within source page 112. In one embodiment, the threshold is set by an operator. For example, an operator may specify word counts, topic synonyms, values for what percentage of the page must be relevant, number of words in source page 112 around the hyperlinked text that are to be included in the search, specific words, phrases, web page addresses, author names, other words that are rare and that should be given a greater weight if found, and removal of words to include in the search of source page 112 and hyperlinked pages (e.g. a page of pages 110-1 through 110-N).

In one embodiment, hyperlink detection program 108 uses text analytics to parse through all available employment related entry information and create topics based on keywords or common themes within employment related entry descriptions or linked materials. Using natural language processing and at least one set of dictionaries and rules, hyperlink detection program 108 can perform text analytics on source page 112, and page 110-1 through page 110-N. Text analytics can be performed using an Unstructured Information Management Architecture (UIMA) application configured to analyze unstructured information to discover patterns relevant to source page 112 and page 110-1 through page 110-N by processing plain text and identifying relations.

If hyperlink detection program 108 determines that the selected hyperlink and corresponding page meets the required threshold rating or other threshold requirements (decision 208, yes branch), hyperlink detection program 108 causes the selected hyperlink to remain active. If hyperlink detection program 108 determines that the selected hyperlink and corresponding page does not meet the required threshold rating or other threshold requirements (decision 208, no branch), hyperlink detection program 108 will cause the selected hyperlink to be removed (see step 210).

In an alternate embodiment, upon completion of source page 112, each page (e.g., page 110-1 through 110-N) associated with a hyperlink (e.g. hyperlink 114-1 through 114-N) will be retrieved. In such an embodiment, the corresponding pages (e.g., page 110-1 through 110-N) will be compared to the previous version of the page, as previously stored by an alternate version of hyperlink detection program 108 upon creation of source page 112. Thus, the threshold rating will be based on the original context of the page (e.g., page 110-1 through 110-N) and not a modified version. In one embodiment, hyperlink detection program 108 can run at the completion of source page 112 to set a benchmark threshold rating of hyperlinks (e.g., hyperlink 114-1 through 114-N) for all future runs of hyperlink detection program 108 to base the future threshold ratings off of.

In step 210, hyperlink detection program 108 removes the selected hyperlink from source page 112. In one embodiment, hyperlink detection program 108 removes the selected hyperlink from source page 112 by removing the HTML hyperlink code text. For example <a href=http://www.genericwebsite.com>Hyperlink code</a> from source page 112. In one embodiment, the removal of the hyperlink code text will break the link between source page 112, an embedded hyperlink (e.g., hyperlink 114-1 through 114-N), and a corresponding hyperlinked page (e.g., page 110-1 through 110-N). In another embodiment, where an embedded hyperlink (e.g., hyperlink 114-1 through 114-N) is embedded in text such as, but not limited to, "click" or "click here," hyperlink detection program 108 will remove an embedded hyperlink (e.g., hyperlink 114-1 through hyperlink 114-N) and the text from source page 112 to keep source page 112 free of illogical hyperlink text fragments. After hyperlink detection program 108 removes the selected hyperlink, hyperlink detection program 108 determines whether additional hyperlinks that have not been analyzed are embedded within source page 112 (see decision 212).

In decision 212, hyperlink detection program 108 determines whether there is another hyperlink (e.g., hyperlink 114-1 through 114-N) that has not yet been analyzed. For example, hyperlink detection program 108 may go back to search from the beginning of source page 112 to locate another hyperlink (e.g., hyperlink 114-1 through 114-N) and if hyperlink detection program 108 locates another hyperlink (e.g., hyperlink 114-1 through 114-N) (decision 212, yes branch), hyperlink detection program 108 will repeat steps 204 through 208, as previously describe, upon the newly selected hyperlink. In some embodiments, hyperlink detection program 108 repeats this process for all hyperlinks (e.g., hyperlink 114-1 through 114-N) until all hyperlinks embedded within source page 112 have been analyzed. In one embodiment, hyperlink detection program 108 searches source page 112 for all hyperlinks (e.g., hyperlink 114-1 through 114-N) before performing the analysis on each hyperlink (e.g., hyperlink 114-1 through 114-N) and performs the analysis simultaneously, or iteratively, on each identified hyperlink. If hyperlink detection program 108 determines that there are no more additional hyperlinks to analyze, in some embodiments, the function is complete. In other embodiments, if hyperlink detection program 108 determines that there are no more additional hyperlinks to analyze (decision 212, no branch), hyperlink detection program 108 generates a report (step 214).

In step 214, hyperlink detection program 108 generates a report of the results from the analysis of source page 112 and all hyperlinked pages (e.g. pages 110-1 through 110-N). The report indicates to the operator the results of the analysis performed by hyperlink detection program 108. The report may be presented to an operator to show actions taken by hyperlink detection program 108 with regard to hyperlinks (e.g., hyperlink 114-1 through 114-N) embedded in source page 112. In one embodiment, the operator would be able view the results and have the ability to modify hyperlink detection program 108 decisions with respect to the hyperlinks (e.g., hyperlink 114-1 through 114-N). In one embodiment, hyperlink detection program 108 merely performs an analysis and generates a report. In such an embodiment, hyperlink detection program 108 omits step 210 and does not remove hyperlinks (e.g., hyperlink 114-1 through 114-N) from source page 112. In such an embodiment, hyperlink detection program 108 provides a report such that a user may decide which hyperlinks (e.g., hyperlink 114-1 through 114-N) shall remain active and which hyperlinks should be removed from source page 112.

In some embodiments, hyperlink detection program 108 is set to run at a predetermined interval once source page 112 is completed. In one embodiment, hyperlink detection program 108 is activated only at the operator's request. In another embodiments, hyperlink detection program 108 can be set by the operator to perform at a specific time and at a specific repetition rate (hourly, daily, weekly).

Figure 3:
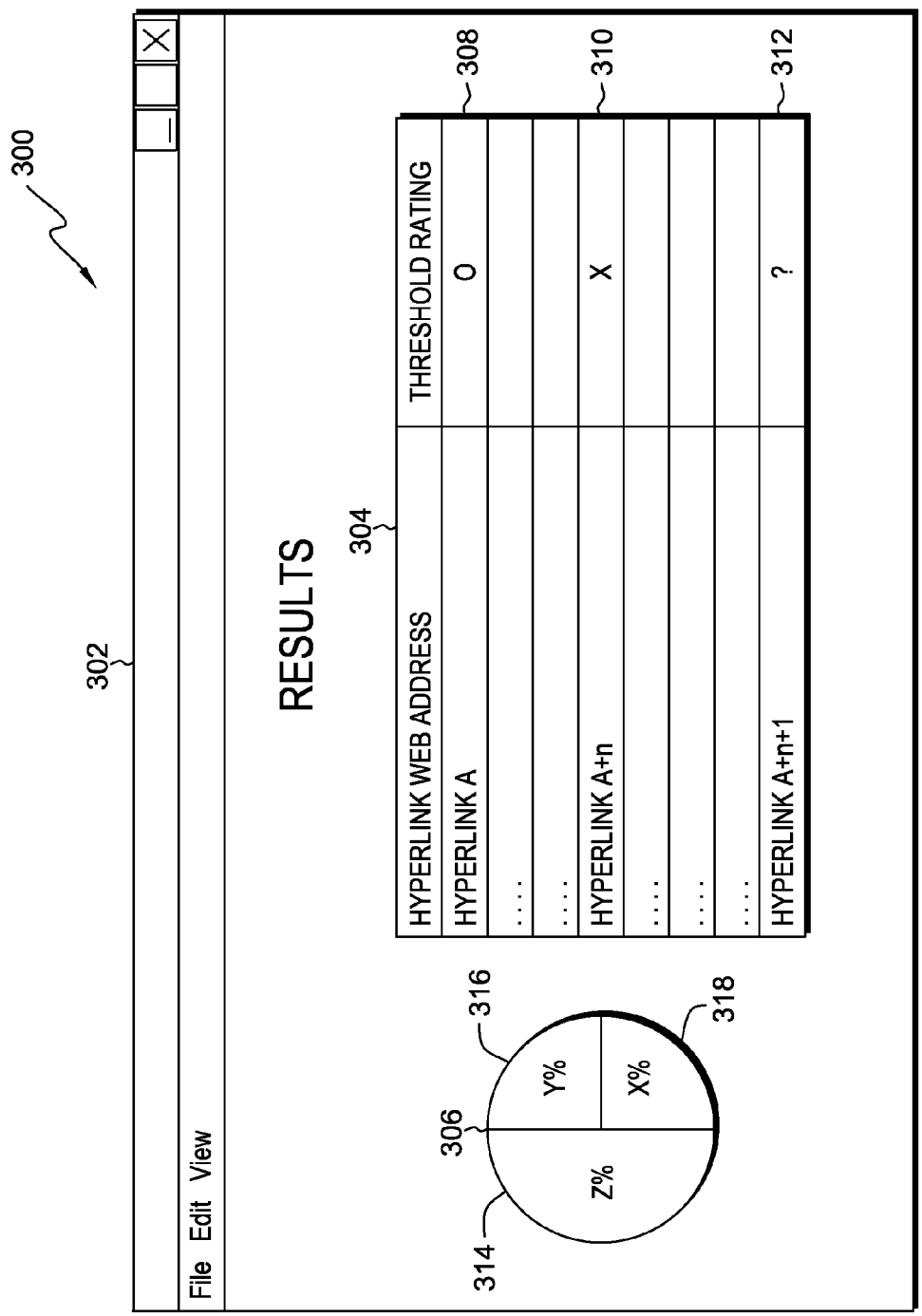
FIG. 3 shows an embodiment of an analysis result screen as generated by a hyperlink detection program, in accordance with one embodiment of the present invention.

FIG. 3 depicts an embodiment of a user interface 300 of an example report generated by hyperlink detection program 108. In one embodiment, hyperlink detection program 108 generates a report and causes the report to be sent to an operator. In some embodiments this is at the request of the operator. In the depicted embodiment, user interface 300 is comprised of window 302, textual results 304, and graphical results 306. The purpose of the report is to inform the operator of the status of hyperlinks (e.g., hyperlink 114-1 through 114-N) embedded within source page 112 and the threshold rating of hyperlink detection program 108 assigned to each hyperlink (e.g., hyperlink 114-1 through 114-N).

Window 302 is a graphical control element, consisting of a visual area containing some of the graphical user interface (GUI) of hyperlink detection program 108. Window 302 can contain, but is not limited to, a menu-bar, toolbars, controls, icons, and a working area. The working area can contain, but is not limited to, textual results 304, graphical results 306, panels, or other representations of data created by hyperlink detection program 108.

Textual results 304 within window 302, display all analyzed hyperlinks (e.g., hyperlink 114-1 through 114-N) embedded in source page 112. In one embodiment, textual results 304 displays the hyperlink web address (e.g., hyperlink 114-1 through 114-N), ratings indicator 308, indicator 310, and indicator 312. In further embodiments, textual results 304, if present, can be in any format including but not limited to a list, index, catalog, or spread sheet. Further embodiments, of the information of the textual results 304 could include, but are not limited to, individual clicks on each respective link since the last analysis, total number of clicks on the link, or percentage of keyword similarities. In the depicted embodiment, the rating of the hyperlinks are shown as an indicator 308 for a positive keyword analysis, an indicator 310 for a negative keyword analysis and an indicator 312 for a suspect hyperlink. An indicator 308 is a threshold rating based on hyperlink detection program 108 analysis threshold rating, and an indicator 312 is a threshold rating that is better than an operator set analysis threshold rating but worse than hyperlink detection program 108 base threshold rating.

In a further embodiments, indicators 308, 310, 312 can be any symbol or image that can be distinguished from each other so the operator an easily assess the quality of the hyperlinked page, or color coding the text related to the threshold rating of each hyperlink. For example, a "good" threshold rating would result in indicator 308 to be green, a "bad" threshold rating would result in indicator 310 to be red. In another embodiment, a "suspect" threshold rating would result in indicator 312 to be yellow. If the results are in a spread sheet, the cells related to the hyperlink could be highlighted to match the threshold rating of the hyperlink.

Graphical results 306 is any visual representation of the results of hyperlink detection program 108. In one embodiment, these results are shown in a pie chart separated into three sections represented by indicator 314, indicator 316, and indicator 318. Indicator 314 is related to indicator 308, indicator 316 is related to indicator 310, and indicator 318 is related to indicator 312 showing a visual representation of textual results 304. In further embodiments, there can be more or less indicators given the information presented to the operator, determined by textual results 304 and how many indicators are used in textual results 304. In other embodiments, graphical results 306 can be a line graph, pictograph, or any other graphical representation to visualize to the operator the results of hyperlink detection program 108 analysis. This creates a greater visual representation of results generated by hyperlink detection program 108 and the quality of hyperlinks embedded within source page 112 (e.g., hyperlink 114-1 through 114-N). In one embodiment, if user interface 300 has both textual results 304 and graphical results 306 if the operator selects indicator 314, 316, or 318 of graphical results 306, the hyperlink (e.g. hyperlink 114-1 through 114-N) that had received the same threshold rating would be highlighted in textual results 304.

Figure 4:
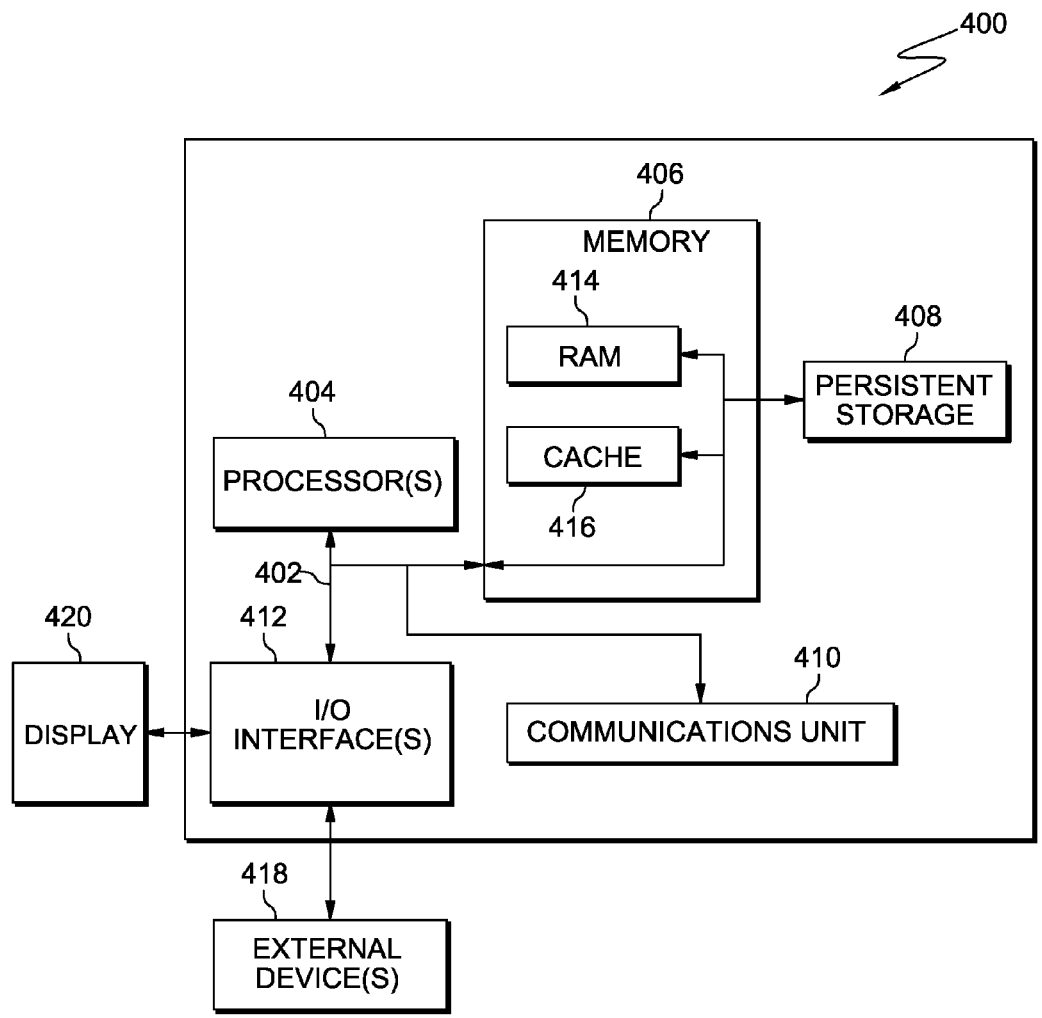
FIG. 4 is a block diagram of internal and external components of the client computing device(s) and the servers of FIG. 1, in accordance with one embodiment of the present invention.

FIG. 4 depicts a block diagram of a computing system component structure 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 104 and server 106-1 through 106-N include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Database 116, hyperlink detection program 108, and source page 112, including hyperlinks 114-1 through 114-N, are stored in persistent storage 408 of server 104 for execution and/or access by one or more of the respective computer processors 404 of server 104 via one or more memories of memory 406 of server 104. Pages 110-1 through 110-N are respectively stored in persistent storage 408 of servers 106-1 through 106-N for access by one or more of the respective computer processors 404 of servers 106-1 through 106-N via one or more memories of memory 406 of servers 106-1 through 106-N. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing computer readable program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 508.

Communications unit 410, in these examples, provides for communications with other data processing systems or devices. In these examples, communications unit 410 includes one or more network interface cards. Communications unit 410 may provide communications through the use of either or both physical and wireless communications links. Database 116, hyperlink detection program 108, and source page 112, including hyperlinks 114-1 through 114-N, may be downloaded to persistent storage 408 of server 104 through communications unit 410 of server 104. Pages 110-1 through 110-N may be downloaded, respectively, to persistent storage 408 of servers 106-1 through 106-N through communications unit 410 of servers 106-1 through 106-N.

I/O interface(s) 412 allows for input and output of data with other devices that may be connected to server 104 and/or servers 106-1 through 106-N. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., database 116, hyperlink detection program 108, source page 112, including hyperlinks 114-1 through 114-N, and pages 110-1 through 110-N, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting hyperlinks to inapplicable content, the method comprising:
   identifying, by one or more processors, a hyperlink within a first webpage, wherein the hyperlink references a second webpage;
   determining, by one or more processors, whether the hyperlink within the first webpage is active;
   responsive to determining that the hyperlink is active, accessing, by one or more processors, content of the second webpage at a current time;
   determining, by one or more processors, whether content of the second webpage at the current time matches, within a first predefined threshold, the content of the second webpage at a time of creation of the first webpage by performing text analytics to identify at least one subject of the content of the first webpage, comparing the content of the second webpage to the at least one subject of the content of the first webpage, and determining whether the at least one subject of the content of the first webpage matches, within the predefined threshold, the content of the second webpage;
   determining, by one or more processors, whether content of the second webpage at the current time matches, within a second predefined threshold, to the content of the first webpage at the current time; and
   responsive to determining that the content of the second webpage at the current time does not match, within the first predefined threshold, the content of the second webpage at the time of creation of the first webpage and the content of the second webpage at the current time does not match, within the second predefined threshold, the content of the first webpage at the current time, removing, by one or more processors, the hyperlink from the first webpage.

2. The method of claim 1, further comprising:

responsive to determining that the content of the second webpage at the current time does not match, within the first predefined threshold, the content of the second webpage at the time of creation of the first webpage and the content of the second webpage at the current time does not match, within the second predefined threshold, the content of the first webpage at the current time, generating, by one or more processors, a report, wherein the report indicates that the content of the second webpage accessible by the hyperlink is inapplicable to the content of the first webpage.

3. The method of claim 1, further comprising:

responsive to determining that the content of the second webpage at the current time does match, within the first predefined threshold, the content of the second webpage at the time of creation of the first webpage and the content of the second webpage at the current time does match, within the second predefined threshold, the content of the first webpage at the current time, generating, by one or more processors, a report, wherein the report indicates that the content of the second webpage accessible by the hyperlink is applicable to the content of the first webpage.

4. The method of claim 1, wherein the content of the first webpage is text of the hyperlink and text neighboring the hyperlink within a predefined number of words of the hyperlink.

5. The method of claim 1, further comprising:

removing, by one or more processors, text of the hyperlink from the first webpage.

\* \* \* \* \*